June 13, 1967 H. W. OLSEN 3,324,806
BELT-TYPE CONVEYORS
Filed Oct. 23, 1965 5 Sheets-Sheet 5
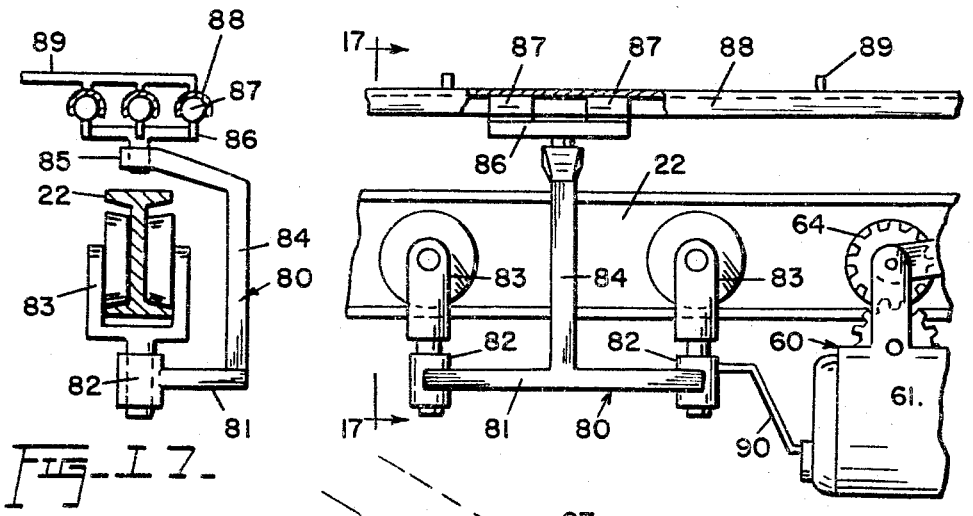
Fig-17.
Fig-16.
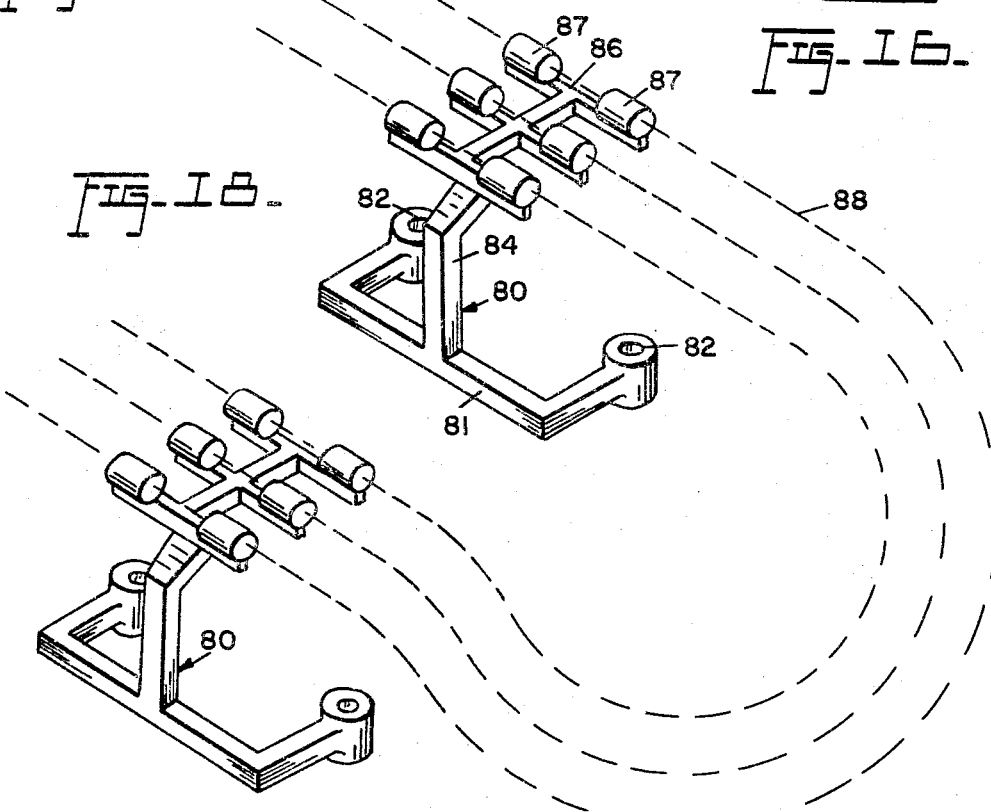
Fig-18.
Fig-19.
INVENTOR:
HORACE W. OLSEN
By: 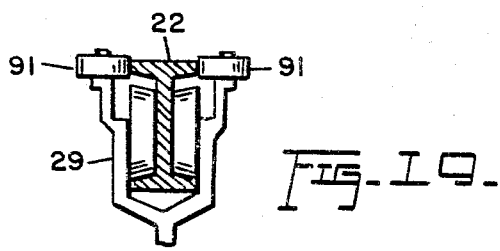

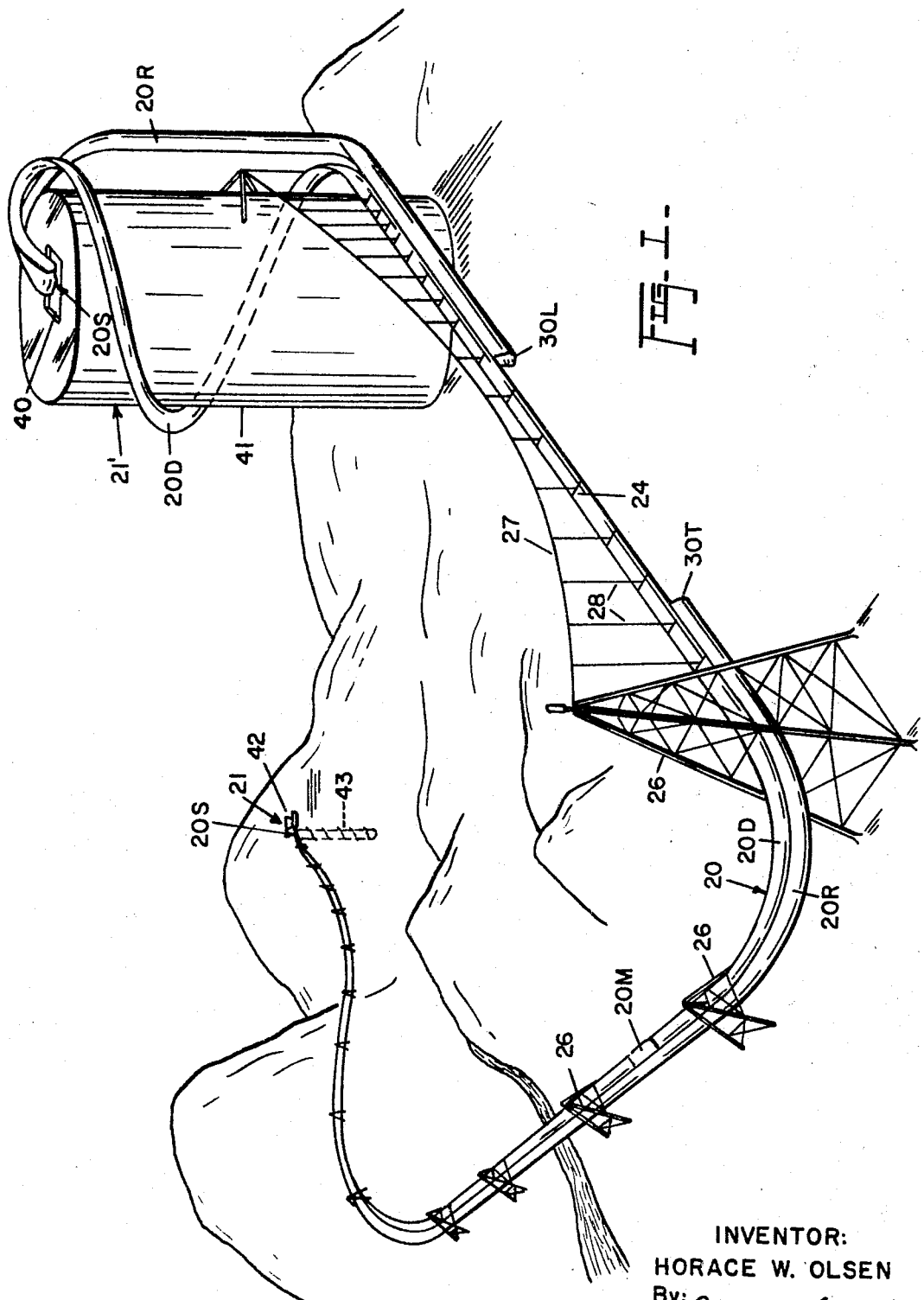

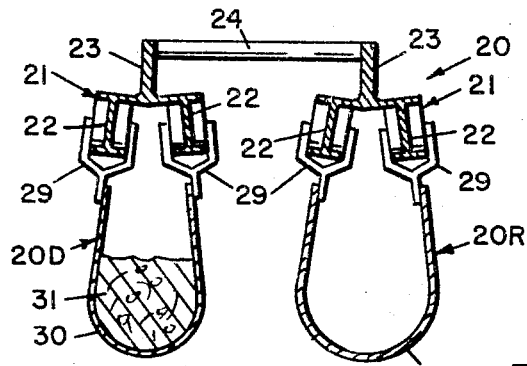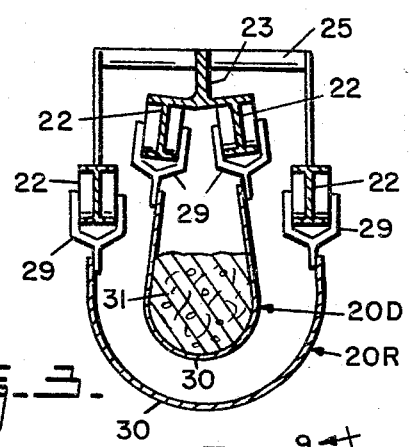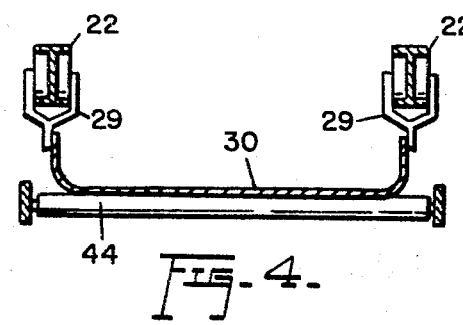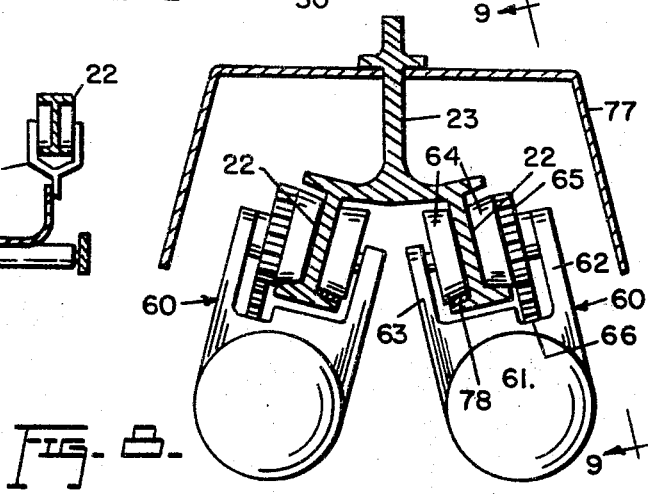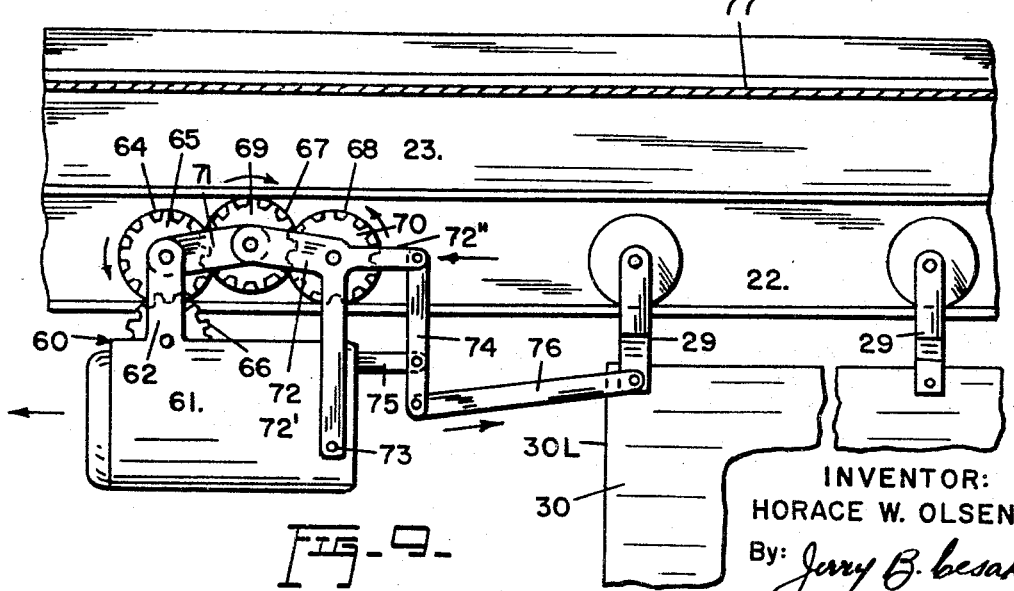

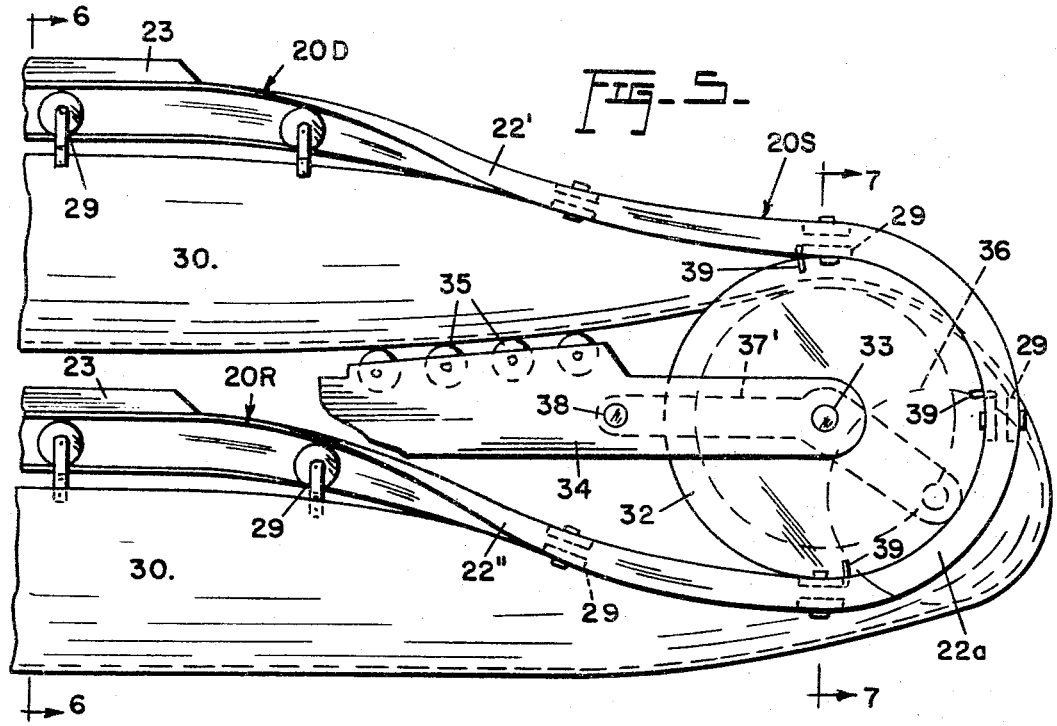
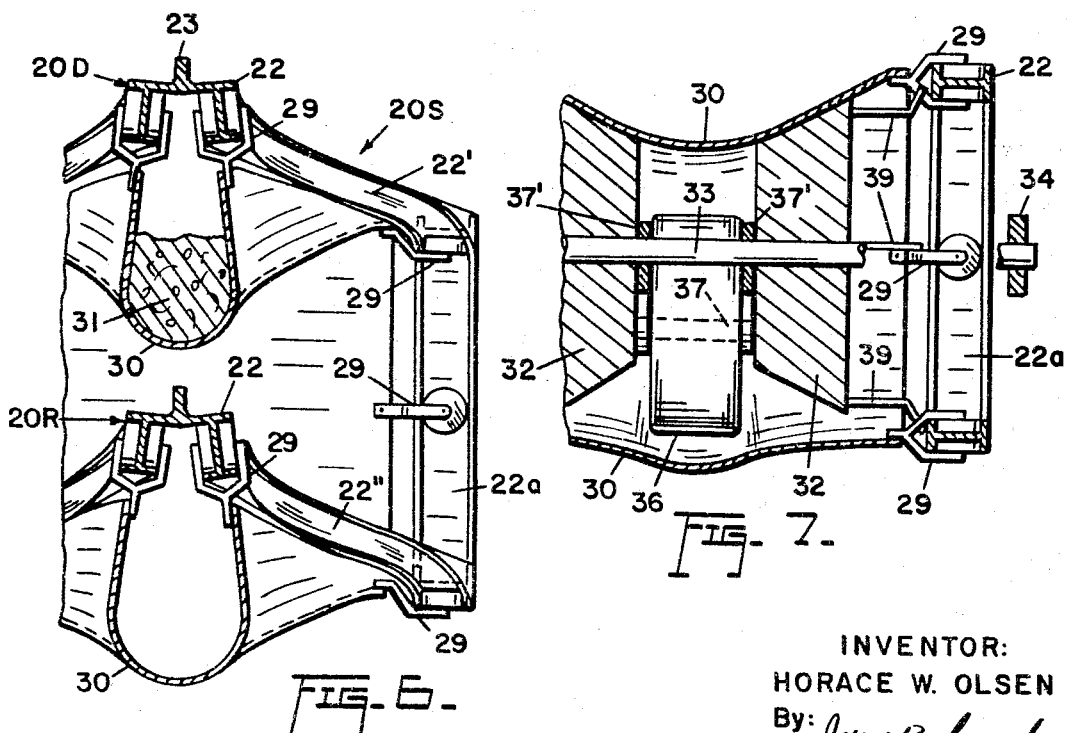

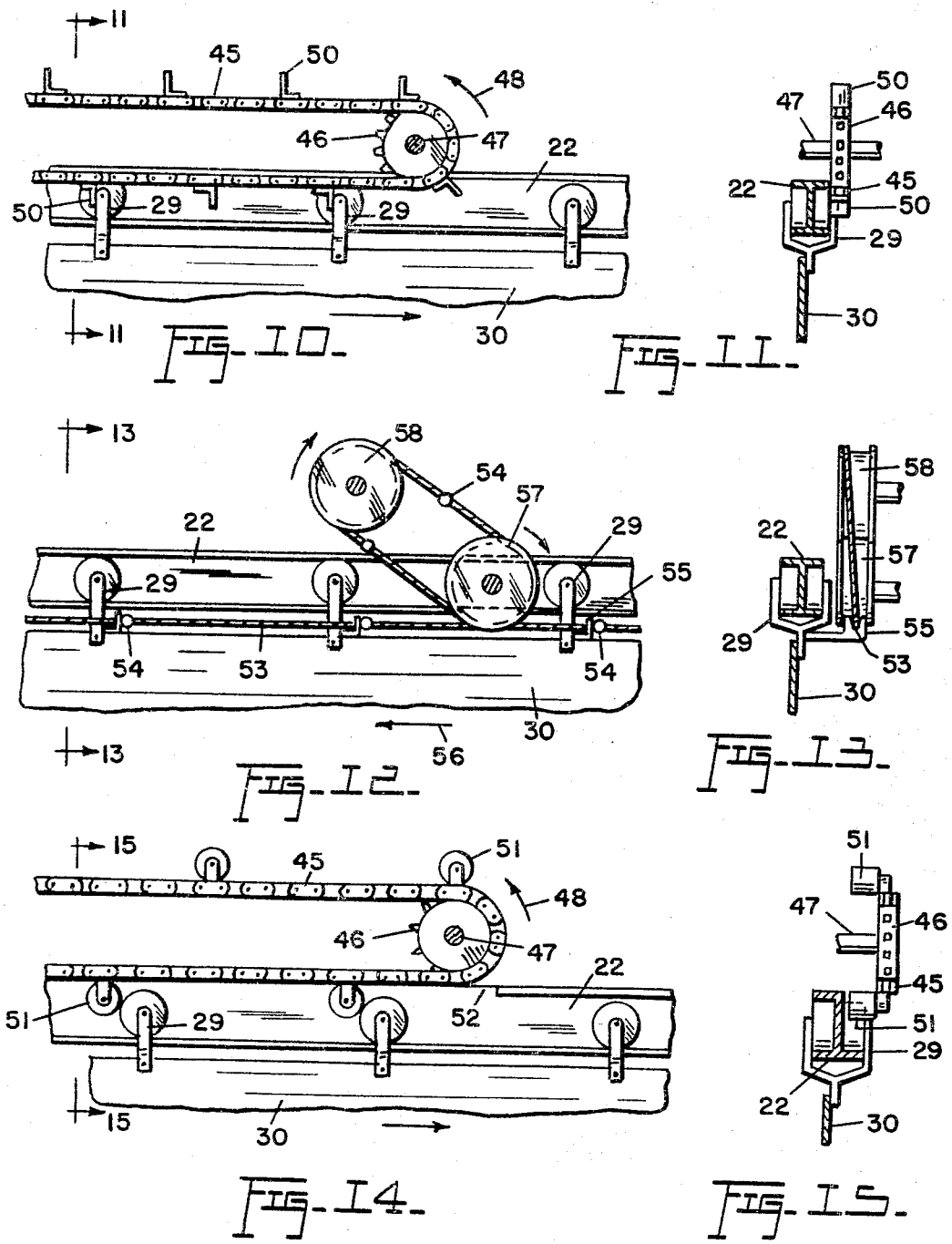

United States Patent Office 3,324,806
Patented June 13, 1967

---

3,324,806
BELT-TYPE CONVEYORS
Horace W. Olsen, Houston, Tex., assignor to
H. P. Albrecht, Houston, Tex.
Filed Oct. 23, 1965, Ser. No. 503,600
15 Claims. (Cl. 105—150)

This invention relates to new and useful improvements in belt-type conveyors, and in particular the invention concerns itself with conveyors of this type wherein the belt is suspended from trolleys riding along an elevated track.

The principal object of the invention is to provide a trolley-suspended belt-type conveyor which may be conveniently and economically used for transportation of various kinds of material over considerable distances, on the order of thousands of yards or several miles, if so desired. As such, the conveyor of the invention is particularly suitable, for example, for transporting ore from the area of ore deposits, coal from mines, sand or gravel from quarries, et cetera, to distant places where such materials are stored, processed or otherwise dealt with. The elevated conveyor track, which may conveniently be supported by spaced towers or suspended from cables stretched between such towers, permits the conveyor to pass over uneven or undeveloped terrain so that transportation of material may be effected without the necessity of building roads, bridges, and the like.

Another important feature of the invention resides in its particular belt, trolley and track arrangement which is such that pairs of trolleys running along two juxtaposed rails of the track, support the opposite longitudinal side edges of the belt so that the belt is troughed for carrying material within the trough hereof. However, at selected points along the rack, the track rails are spaced apart so as to transversely extend the troughed belt into a substantially flat form, so that material may be unloaded from or loaded onto the extended belt.

The track of the conveyor is an endless track, having what may be called a delivering track run and a returning track run, with track switch-over means at the ends of the runs for continuously transferring the belt supporting trolleys from one track run to the other. The aforementioned spaced apart arrangement of the track rails is conveniently located at such track switch-over means to flatten the troughed belt at those locations for loading and unloading purposes. However, it may also be located intermediate the length of the delivering track run, if loading at such point is desired. The delivering and returning runs of the conveyor may conveniently extend alongside of each other, although if preferred, the track arrangement may be such that the belt along the return run is also troughed to enclose the troughed belt of the delivering run, this being especially useful in places where it is required to maintain the conveyor at minimum width and/or height because of natural or other obstructions.

Another important feature of the invention involves the provision of novel means for propelling or driving the belt, not by an end roller such as is customary in the conveyor belt art, but rather by propulsion of the belt carrying trolleys along the track. In one form of such propelling means the drive mechanism may be stationed at a convenient point alongside the track for drivingly engaging the trolleys as they travel therepast. In another form, the propelling means may be a self-powered trolley which propels itself along the track and pulls the belt along with it. In the latter instance the belt need not be an endless belt but may simply have a determinate length with leading and trailing ends and the self-powered trolley at the leading end thereof. Thus, a determinate belt length so equipped, in effect becomes a self-powered transport vehicle, capable of traveling along its endless track either by itself or in addition to others, as transportation requirements may demand.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a perspective view exemplifying an installation of the conveyor of the invention;

FIGURE 2 is an enlarged cross-sectional view showing the delivering and returning runs of the conveyor side by side;

FIGURE 3 is a cross-sectional view showing the delivering conveyor run within the returning run;

FIGURE 4 is a cross-sectional view of the conveyor belt transversely extended for loading or unloading;

FIGURE 5 is a fragmentary side elevational view of the conveyor at the track switch-over connecting the delivering and return track runs;

FIGURE 6 is a fragmentary cross-sectional view, taken substantially in the plane of the line 6—6 in FIG. 5;

FIGURE 7 is a fragmentary sectional view, taken substantially in the plane of the line 7—7 in FIG. 5;

FIGURE 8 is a cross-sectional view of the track and self-powered trolleys;

FIGURE 9 is a fragmentary side elevational view, taken substantially in the plane of the line 9—9 in FIG. 8;

FIGURE 10 is a fragmentary side elevational view showing another embodiment of the belt propelling means;

FIGURE 11 is a fragmentary detail, taken substantially in the plane of the line 11—11 in FIG. 10;

FIGURE 12 is a fragmentary side elevational view, showing another modified arrangement of the belt propelling means;

FIGURE 13 is a fragmentary detail, taken substantially in the plane of the line 13—13 in FIG. 12;

FIGURE 14 is a fragmentary detail in side elevation, showing still another embodiment of the belt propelling means;

FIGURE 15 is a fragmentary detail, taken substantially in the plane of the line 15—15 in FIG. 14;

FIGURE 16 is a fragmentary side elevational view of a current collecting trolley;

FIGURE 17 is a fragmentary cross-sectional view, taken substantially in the plane of the line 17—17 in FIG. 16;

FIGURE 18 is an isometric view, largely in diagrammatic form, showing the action of the current collecting trolleys at the track switch-over means; and FIGURE 19 is a fragmentary cross-sectional view of a trolley with guiding rollers at the sides of the track rail.

Referring now to the accompanying drawing in detail, FIG. 1 shows by way of an example, a conveyor installation in accordance with the invention, although it will be understood that this is for illustrative purposes only and that the conveyor may be installed so as to suit particular locations and particular requirements under conditions of material transportation which it is intended to perform. As shown, the conveyor designated generally by the numeral 20 is used to transport material from a site 21 to a site 21' over a considerable distance which may be on the order of several miles, over uneven or undeveloped terrain, including hills, streams, or the like, if so necessary.

As shown in the enlarged, cross-sectional view of FIG. 2, the conveyor 20 has a material delivering run 20D and a returning run 20R, the two runs being disposed side-by-side. Alternatively, the two runs may be disposed one above the other, or if preferred, the return run 20R may envelope the delivery run 20D as shown in FIG. 3, all of which will hereinafter become apparent.

In any event, each run of the conveyor comprises a track 21 which includes two spaced, juxtaposed track rails 22, the track rails preferably although not necessarily being of an I-beam cross-section, as shown. Conveniently, the two track rails 22 may be connected together by a spine 23 as shown in FIG. 2, and if the delivering and returning runs of the track are juxtaposed as shown in that figure, the two spines 23 of the track runs may be tied together by transverse rods or bars 24. Alternatively, as in FIG. 3, the individual rails 22 of the returning conveyor run 20R may be supported from the spine 23 of the delivering track run 20D by suitable suspension means 25. Regardless of the type of track mounting, it will be observed from FIG. 1 that the track is an elevated track which is supported above the ground at longitudinally spaced points in a suitable manner, such as by standards or towers 26. Moreover, cables may be stretched between such towers as indicated at 27, and the conveyor track may be suspended from such cables as indicated at 28, so as to provide support for the track at several points along the length of the cable 27 between adjacent towers.

Referring again to FIG. 2, it will be noted that the two rails 22 of the track 21 have pairs of trolleys 29 riding therealong, these trolleys being secured to opposite longitudinal side edges of a conveyor belt 30 of flexible material. Also as shown in FIG. 2, the belt 30 is so wide and the two rails 22 of the track are so closely spaced that the belt is troughed as illustrated, this troughing being of particular advantage in the delivering run of the conveyor where it effectively serves to retain the material 31 in place within the troughed conveyor belt. In the instance of FIG. 3, the individual rails 22 of the returning track run 20R are spaced apart further than those of the delivering run 20D, but the belt of the returning run is still troughed with sufficient width to protectively accommodate therewithin the delivering run 20D.

Reference is now drawn to FIGS. 5–7 which illustrate track switch-over means 20S for continuously connecting together adjacent ends of the delivering and returning runs 20D and 20R at the conveyor sites 21, 22 exemplified in FIG. 1. The delivering run 20D of the track approaches the switch-over means 20S from the top as shown in FIG. 5 and, in so doing, the track rails 22 of the delivering run become gradually separated from each other and also become longitudinally twisted in an outward and downward direction as indicated at 22', so that in effect, the central webs of the I-beam track rails are translated from a vertical into a horizontal plane. At that stage the widely separated track rails sweep downwardly through an arc of approximately 180° as indicated at 22a, and then are axially or longitudinally twisted in an upward and inward direction as at 22″, during which they also converge toward each other so as to smoothly merge into the returning track run 20R. It is significant to note in this regard that the aforementioned longitudinal twisting of the track rails is such that what may be regarded as the top of the rail in the delivering run 20D is still the top of the rail in the returning run 20R. However, what may be regarded as the inside of the rail in the delivering run becomes the outside in the returning run, and vice versa, this being due to the particular twisting of the rails, as described.

As the belt supporting trolleys 29 ride along the rails of the delivering track run 20D, they gradually translate their vertical position to a horizontal position due to the aforementioned twisting of the track rails, and at the same time the gradual spreading of the rails and trolleys causes the conveyor belt to be transversely extended from its normal troughed form into a more-or-less flat form, as the belt travels around the track switch-over means 20S. For purposes of guiding the belt around the curvature of the track switch-over means, a pair of transversely spaced, inwardly tapered, frusto-conical pulleys 32 are provided within the track switch-over means 20S, such pulleys being carried by a shaft 33 journalled in a suitable framework 34 concentrically with the curvature of the rails portions 22a. Also, to assist in the aformentioned transverse extension and flattening of the conveyor belt as it approaches the pulleys 32 a substantially flat bed of rotatable rollers 35 is provided in advance of the pulleys, such rollers being conveniently supported by the framework 34 and supportably underlying the conveyor belt in its transformation from a troughed to a substantially flat form, as will be readily apparent.

What may be referred to as the top or inner surface of the belt 30 in the delivering run 20D of the conveyor becomes the bottom or outter surface thereof in the returning run 20R, and inasmuch as in both runs the belt is more-or-less troughed, means are provided for flexing the troughed form of the belt from the inside to the outside during its passage around the track switch-over means 20S. Such belt flexing means may conveniently assume the form of a guide roller 36 carried by a shaft 37 between a pair of bell cranks or yokes 37' which are rockably mounted on the aforementioned shaft 33 but are held in a fixed position by a cross pin 38 which passes transversely through the yokes 37' and is anchored in the framework 34. The arrangement is such that the guide roller 36 is held in a projected position, radially outwardly beyond the curvature of the rail portion 22a of the track switch-over 20S, so that the conveyor belt 30, in its passage around the track switch-over, is assisted by the projecting roller 36 in flexing its inner surface to the outside, as the belt flows from the delivering run 20D to the returning run 20R.

It may be noted at this point that, unlike end rollers in conventional endless belt conveyors, the pulleys 32 and guide roller 36 in the present invention are not at all intended to impart a drive to the conveyor belt. Rather, their purpose is merely to guide the belt around the track switch-over means 20S, while belt propulsion is effected by entirely different means, hereinafter to be described. However, and still on the order of guiding the belt around the switch-over means 20S, it will be observed that the pulleys 32 are equipped with outwardly projecting radial prongs 39 which turn with the pulleys as the pulleys are rotated by passage of the conveyor belt therearound, and the prongs 39 operatively engage the trolleys 29 so as to propel the trolleys along the curvature of the rail portions 22a of the track switch-over means 20S.

It will be apparent from the foregoing that, as the troughed belt in the delivering run 20D carrying the material 31 approaches the track switch-over 20S, the transverse extension of the belt into a substantially flat form will cause the material 31 to be discharged from the belt at that point, as for example, into an inlet opening 40 at the top of a storage bin or silo 41 at the conveyor site 22, as exemplified in FIG. 1. The track arrangement of the conveyor is such that the delivery run 20D may conveniently extend upwardly in a spiral fashion around the silo 41 to the top of the latter, while the returning run 20R passes downwardly in a more-or-less straight slope, to be united with the deliverying run 20D after leaving the silo, as generally indicated.

At the other end of the conveyor, that is, at the site 21 as shown in FIG. 1, the transverse extension and flattening of the conveyor belt at the track switch-over 20S conveniently provides the necessary facility for loading the belt, as for example by a supply of material in a hopper 42, or the like. Alternatively, if the material to be transported is located at the bottom of a mine, the conveyor may extend down into the mine in a spiral fashion as indicated at 43, in a manner similar to that at the site 22.

Under some circumstances it may be desirable to load the conveyor intermediate the length of the delivering run 20D, as for example at some point 20M indicated in FIG. 1. In such event the rails 22 of the delivering conveyor run 20D may be spread apart as shown in FIG. 4, so as to transversely extend and flatten the belt 30 for loading purposes. A flat bed of rotatable, conveniently mounted supporting rollers 44 may be provided under the extended belt in such a region, similar to the roller bed 35 at the track switchover means 20S already described in connection with FIGS. 5–7.

Propulsion of the conveyor belt along the track may be effected in various ways, one arrangement being shown in FIGS. 10 and 11. Here an endless drive chain 45 is provided in parallel alongside a suitably long stretch of the track rail 22, the chain passing around end sprockets one of which is shown at 46 is being carried by a shaft 47. The latter is suitably journalled and driven by a motor (not shown) in the direction of the arrow 48 and the chain 45 is equipped with driving lugs 50 which are adapted to drivingly engage the trolleys 29 for propelling the trolleys along with the belt 30 along the track. FIGS. 14 and 15 illustrate a similar driving arrangement, except that in place of the lugs 50 the chain is equipped with rotatable rollers 51 which drivingly engage the wheels of the trolley 29 with a rolling contact. The top flange of the rail 22 may be cut away as at 52 for the length of the chain 45, so that the rollers 51 may contact the trolleys.

In another modified form of the belt propelling means shown in FIGS. 12 and 13, a cable 53 extends along the entire length of the belt 30 and is provided at spaced points with enlargements 54. The cable 53 passes through notched brackets 55 which are secured to the trolleys 29, and the enlargements 54 contact the brackets to propel the belt along as at 56 when the cable 53 is driven in the same direction. Drive to the cable 53 is imparted by a pair of suitably mounted pulleys 57, 58, one of which is driven, as by a motor (not shown). As the cable 53 approaches the drive mechanism in the direction 56, it passes under the pulley 57, around the pulley 58 and then over the pulley 57 before continuing its travel alongside of the belt 30. The notched brackets 55, of course, permit the cable to leave the brackets for its travel around the pulleys 57, 58, as will be apparent.

Another embodiment of the belt propelling means is shown in FIGS. 8 and 9, wherein there is provided a self-powered trolley 60 on each of the two track rails 22. Each trolley 60 essentially comprises an electric motor 61 contained in a housing which includes upwardly projecting arms 62, 63 carrying a pair of wheels or rollers 64 for travel along the lower flanges of the track rail 22. One of the rollers 64 is secured concentrically to a gear 65 meshing with a gear 66 driven by the motor 61, so as to propel the trolley along the track. In order to prevent slippage and to attain a more positive driving engagement of the trolley with the track rail, additional rollers 67, 68 are provided, the same being driven through a gear train 69, 70 from the aforementioned gear 65, as will be apparent from FIG. 9. The rollers 67, 68 are supported by articulated linkages 71, 72, the link 72 having an extension 72' pivoted to the motor housing 61 as at 73 and also having another extension 72" which has pivoted thereto a link 74. The link 74 is pivoted intermediate its ends to a bracket 75 on the motor housing 61 and is coupled by another link 76 to the conveyor belt 30, as for example, to one of the trolleys 29.

It will be understood that when the motor 61 is energized, the rollers 64, 67, 68 will be driven and the trolley 60 will be propelled along the track, thus pulling the conveyor belt along with it by virtue of the connecting link 76. Moreover, the pulling force of the link 76 will act through the articulated linkage 74, 72, 71 to press the rollers 64, 68 against the lower flange of the rail and to similarly press the roller 67 against the top flange of the rail, thus providing an effective driving arrangement.

Manifestly, when the self-powered trolley 60 is employed, the conveyor belt 30 has a determinate length, with a leading end 30L to which the trolley 60 is coupled, and a trailing end 30T, as is diagrammatically represented in FIG. 1. As such, the belt of determinate length with its trolley 60 in effect becomes a self-powered vehicle traveling along the track. The length of the belt may be only a few yards and the length of the track may be several miles. More than one such self-powered, belt-type vehicle may be used on the same track at spaced intervals and the track may be provided with switches and sidings on which such vehicles may be sidetracked when not in use. Further still, the conveyor belt may be endless like the track, and the driving trolleys 60 may be interposed at spaced points into the running length of the belt.

For purposes of protecting the trolleys and/or the conveyor belt with its material contents, an inverted channel-shaped cover 77 may be supported by the spine 23 of the track, such a cover extending over as great a length of the track as may be desirable.

Any suitable means may be utilized for delivering electric current to the motor 61 of the self-powered trolley 60. FIG. 8 shows a simple arrangement for illustrative purposes, wherein one of the trolley wheels 64 travels along a conductor strip 78 which is recessed into but insulated from one of the lower flanges of the rail 22. That particular trolley wheel is also insulated from the trolley and is electrically connected to the motor 61. The current return from the motor is taken through the body of the trolley to the other of the wheels 64 and then to the rail 22 which serves as a ground.

In a more complex current collecting arrangement shown in FIGS. 16–18, a separate current collecting trolley 80 is provided to run along the rail 22. The trolley 80 comprises a frame 81 provided with vertical sockets 82 which rotatably support a pair of trolley members 83, the latter riding along the rail 22 at longitudinally spaced points. The frame 81 also has an upwardly extending arm 84 provided at the top thereof with a socket 85 (see FIG. 17) to rotatably receive a carrier 86 having pairs of current collecting shoes 87 mounted thereon. Of course, appropriate insulation is provided where necessary, and the shoes 87 ride inside of substantially semi-cylindrical current conductors 88 which are suitably supported as at 89 above the rail 22. Current from the trolley 80 is delivered to the motors 61, as by the conductor means 90.

FIG. 18 diagrammatically illustrates the current conductors 88 as they pass around the aforementioned twisted portion of the track rails where the delivering run of the conveyor is translated into the returning run, or vice versa. It will be apparent that the rotatable mounting of the trolley members 83 in the sockets 82 and of the shoe carrier 86 in the socket 85 will permit the trolley members and the shoe carrier to turn around as the trolley members travel around the twisted track rails, so that the frame 81 of the trolley 80 is offset to the same side of the track rail in the delivering run as in the returning run and proper polarity of the current supply is constantly maintained.

Finally, FIG. 19 illustrates the belt supporting trolley 29 as being provided with a pair of rotatable side rollers 91 to engage side edges of the upper flanges of the rail 22 for the purpose of preventing any possibility of the running rollers of the trolley rubbing against the central web of the rail, especially in the twisted regions of the rails where transposition is made between the delivering and returning runs of the conveyor.

In conclusion a word may be added concerning the term "troughed" as used herein in conjunction with the conveyor belt of the invention. Conventional so-called "troughed" belts run over troughing idlers arranged usually in sets of three rollers, that is, a horizontal center roller and a pair of side rollers inclined at angles of 20° or 45° from the center roller, with the result that the trough formed by the belt is relatively shallow and the transverse dimension of the belt is such that the belt must necessarily travel in a straight line. On the other hand, the troughed belt of the invention has a substantially U- shaped cross-sectional form which may be regarded as being almost tubular, so that the trough is relatively deep. By virtue of its inherent flexibility and of this particular U-shaped or tubular configuration, the belt of the invention is capable of negotiating curves without any danger of spilling the material being conveyed, it being apparent that the troughed belt within the context of the invention is virtually a closed container which may be propelled at relatively high speeds and around curves without spilling of cargo, which cannot be done with troughed belts of the conventional type.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a belt-type conveyor, the combination of an elevated track, trolleys riding along said track, a conveyor belt suspended from said trolleys, and a motor-driven trolley riding along said track and connected to said belt whereby to propel said conveyor belt along said track.

2. The device as defined in claim 1 wherein said track is an endless track and wherein said conveyor belt is a belt of determinate length having leading and trailing ends.

3. The device as defined in claim 2 wherein said motor-driven trolley is connected to the leading end of said conveyor belt.

4. The device as defined in claim 1 wherein said conveyor belt is troughed.

5. In a belt-type conveyor, the combination of an elevated track including a pair of juxtaposed rails, pairs of trolleys riding along the respective rails of said track, a troughed conveyor belt having its opposite side edges suspended from respective trolleys in each pair, said rails being normally closely spaced whereby to maintain said belt in a troughed form but said track having at least one portion wherein the rails thereof are spaced apart by a distance sufficient to extend the belt transversely into a substantially flat form for loading or unloading of the belt, and a motor-driven trolley riding along said track, said motor-driven trolley being connected to said belt for propelling said belt along said track.

6. The device as defined in claim 5 together with a substantially flat rotatable roller bed provided at said one portion of said track for supporting the transversely extended belt.

7. The device as defined in claim 5 wherein said portion of said track wherein the rails thereof are spaced apart to transversely extend said belt is located intermediate the length of the track.

8. The device as defined in claim 5 wherein said track is an endless track having delivering and returning track runs and track switch-over means continuously connecting the ends of said runs together, said portion of the track wherein the rails thereof are spaced apart to transversely extend said belt being located at said track switch-over means.

9. The device as defined in claim 7 together with rotatable roller means provided at said track switch-over means for guiding the transversely extended belt thereat from one of said track runs to the other.

10. The device as defined in claim 7 wherein said trolleys cooperate with said track switch-over means in reversing said belt so that the inner surface of the troughed belt along one of said track runs becomes the outer surface thereof along the other run.

11. The device as defined in claim 7 wherein said delivering and returning track runs and the respective belt portions suspended therefrom are disposed in spaced juxtaposed relation.

12. The device as defined in claim 7 wherein the rails of the returning track run extend along opposite sides of the delivering track run whereby the belt portion suspended from the delivering track run is disposed within the belt portion suspended from the returning track run.

13. In a belt-type conveyor, the combination of an elevated track, a plurality of trolleys riding along said track, a conveyor belt suspended from certain of said trolleys, a drive motor suspended from another of said trolleys, the drive motor suspending trolley including track engaging wheels and an operative connection of said drive motor to said wheels, and means connecting said belt to said drive motor suspending trolley for propelling said belt relative to the track.

14. The device as defined in claim 13 wherein said means connecting said belt to said drive motor suspending trolley are operative to urge said trolley wheels into engagement with said track.

15. The device as defined in claim 13 together with current conductor means coextensive with said track, and current pick-up means in electrical engagement with said conductor means for delivering current to said drive motor.

References Cited

UNITED STATES PATENTS 2,955,699  10/1960  Lanier _____ 198—191 X

FOREIGN PATENTS 18,736  4/1956  Germany.
733,714  7/1955  Great Britain.

EVON C. BLUNK, *Primary Examiner.*

EDWARD A. SROKA, *Examiner.*